United States Patent [19]
Congdon et al.

[11] Patent Number: 5,149,491
[45] Date of Patent: Sep. 22, 1992

[54] SEED AND BLANKET FUEL ARRANGEMENT FOR DUAL-PHASE NUCLEAR REACTORS

[75] Inventors: Steven P. Congdon, Los Gatos; Russell M. Fawcett, San Jose, both of Calif.

[73] Assignee: General Electric Company, N.Y.

[21] Appl. No.: 708,269

[22] Filed: May 31, 1990

Related U.S. Application Data

[63] Continuation-in-part of Ser. No. 553,073, Jul. 10, 1990.

[51] Int. Cl.$^5$ .............................................. G21C 1/00
[52] U.S. Cl. ................................... 376/267; 376/348; 376/917
[58] Field of Search ............... 376/267, 917, 348, 209, 376/210, 175, 176; 976/DIG. 13, DIG. 33

[56] References Cited

U.S. PATENT DOCUMENTS

| | | | |
|---|---|---|---|
| 3,844,886 | 10/1974 | Crowther | 376/267 |
| 4,292,128 | 9/1981 | Takeda et al. | 376/267 |
| 4,851,181 | 7/1989 | Takeda et al. | 376/267 |

Primary Examiner—Brooks H. Hunt
Assistant Examiner—Frederick H. Voss

[57] ABSTRACT

Fresh fuel bundles are inserted into core locations with small coolant flow orifices, while mid-life fuel bundles are inserted into core locatiosn with large coolant flow locations. Thus, fissile fuel production is promoted at the expense of fissioning early in a bundle lifetime, increasing the effective quantity of fuel available for energy production. Moreover, fissioning is promoted at the expense of conversion later in the bundle lifetime to enhance reactivity of the remaining fissile material and to minimize the further production of fissile fuel. The net result is longer fuel lifetimes and reduced radioactive waste.

8 Claims, 3 Drawing Sheets

SEED AND BLANKET FUEL ARRANGEMENT FOR DUAL-PHASE NUCLEAR REACTORS

BACKGROUND OF THE INVENTION

This is a continuation-in-part of pending U.S. patent application Ser. No. 07/553,073, filed Jul. 10, 1990.

This invention relates to nuclear reactors and, more particularly, to fuel arrangements in a reactor core. A major objective of the present invention is to provide for more thorough fuel burnups to enhance fuel utilization and minimize active waste products.

Dual-phase fission reactors store heat generated by a reactor core primarily in the form a phase conversion of a heat transfer medium from a liquid phase to a vapor phase. The vapor phase can used to physically transfer stored energy to a turbine that drives a generator, to produce electricity. Condensate from the turbine can be returned to the reactor, merging with recirculating liquid for further heat transfer and cooling. The primary example of a dual-phase reactor is a boiling-water reactor (BWR). Dual-phase reactors are contrasted with single-phase reactors, which store energy primarily in the form of elevated temperatures of a liquid heat-transfer medium, such as liquid metal. The following discussion relating to BWRs is readily generalizable to other forms of dual-phase reactors.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

The ability of neutrons to contribute to fissioning depends on the quantity (flux) of neutrons within a "thermal" neutron spectrum. Initially, neutrons released during fissioning move too quickly and have too high an energy to readily induce the further fissioning required to sustain a chain reaction. These high energy neutrons are known as "fast" neutrons. Slower neutrons, referred to as "thermal neutrons", most readily induce fission.

In BWRs, thermal neutrons are formerly fast neutrons that have been slowed primarily through collisions with hydrogen atoms in the water used as the heat transfer medium. Between the energy levels of thermal and fast neutrons are "epi-thermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile U238 to fissile Pu239.

To facilitate handling, fissile fuel is typically maintained in modular units. These units can be bundles of vertically extending fuel rods. Each rod has a cladding which encloses a stack of fissile fuel pellets. The bundles are arranged in a two-dimensional array in the reactor. Neutron-absorbing control rods are inserted between or within fuel bundles to control the reactivity of the core. The reactivity of the core can be adjusted by incremental insertions and withdrawals of the control rods.

Both economic and safety considerations favor longer fuel bundle lifetimes and less frequent refuelings. For a given bundle design, the most obvious method of increasing fuel bundle lifetime is to incorporate more fissile fuel. This can be accomplished without increasing fuel volume by using enriched fissile fuel. However, concerns over criticality limit enrichment to about 5%.

Given optimization of fuel bundle size and fuel enrichment, enhancing fuel bundle lifetimes requires improved fuel utilization, which in turn generally implies more complete fuel "burnups". Approaching complete fuel burnups is made more difficult by temporal variations in the fissioning process. Fissioning continually changes the composition of a fuel bundle, and thus its reactivity. Generally, the changes result in a net decline in reactivity so that a fuel bundle tends to burn hotter near the beginning of its life and cooler near the end.

To some extent the effects of changing composition on reactivity can be addressed by moving the control rods. By inserting control rods early in a bundle lifetime initial burnup rates can be limited. As fissile fuel is spent, the control rods can be withdrawn gradually to even out the power production from a fuel bundle over time. However, the effect of control rod movement on reactivity is too gross to maximize fuel bundle lifetimes.

Burnable poisons, such as gadolinium oxide ($Gd_2O_3$), can be included in a fuel bundle to limit its reactivity early in its lifetime. Burnable poisons compete with fissile fuel for thermal neutrons, limiting their availability for fissioning. Over time, as they absorb neutrons, the burnable poisons are converted to nonpoisonous isotopes so that more thermal neutrons become available for fissioning. The decrease in burnable poisons counters the loss in reactivity that occurs due to the decrease in fissile fuel due to fissioning. In effect, some of the would-be early fissioning is postponed to later in the fuel bundle lifetime when it can be more efficiently utilized. However, burnable poisons leave a poison residue, causing a bundle to expire while retaining a larger quantity of fissile material than would be retained without the poison. This early expiration not only adversely affects fuel efficiency, but also imposes an increased burden on waste disposal.

What is needed is an approach for extending fuel bundle lifetime without requiring bundle resizing or unacceptably high levels of enrichment. Preferably, the approach should allow more complete fuel burnups to minimize the waste disposal problems associated with fuel bundles using burnable poisons.

SUMMARY OF THE INVENTION

In accordance with the present invention, fresh fuel bundles are disposed in core locations accessed by coolant through relatively small apertures. During a later refueling cycle, the partially spent fuel bundles are moved to, preferably, more central core locations accessed by coolant through relatively large apertures. Optionally, fuel bundles can be used a final time in a peripheral location within the core to act as shields. In one realization, these small and large apertures are defined at the core plate.

The present invention promotes actinide conversion at the expense of fissioning during an early fuel cycle and the opposite in a later cycle. This increases the amount of fissile fuel available at midlife, and decreases the amount of actinide fuel generated near the end of a bundle's lifetime so that radioactive waste is minimized.

A fresh bundle located over a small aperture is exposed to slower coolant flows. The slower coolant flow permits boiling to occur lower within the bundle. Earlier boiling yields large steam fractions, and thus less neutron moderation. As a result, the fresh bundle is exposed to a relatively fast neutron spectrum. The fast neutron spectrum limits fissioning and promotes the conversion of fertile fuel to fissile fuel. Thus, the reactivity of the fuel bundle is limited, while fissioning fuel is partially replaced by the conversion of fertile fuel.

During a later refueling cycle, the then partially spent fuel bundle, including conversion products, is relocated to access coolant over a relatively large aperture. The relatively large aperture permits a faster coolant flow, resulting in later boiling, a smaller steam fraction, and more moderation. Thus, more fast neutrons become thermal neutrons capable of promoting fissioning. The reactivity of the bundle is still limited because there is less fissile fuel than when the bundle is fresh. Nonetheless, because of the conversion of fertile fuel, there is more fuel remaining than there would have been had the bundle not been exposed to a fast neutron spectrum early in its lifetime.

The enhanced thermal neutron flux toward the end of the bundle lifetime ensures a relatively thorough burnup of fissile fuel. This staged exposure to fast and then thermal neutron spectra compares favorably with approaches that do not provide dramatic changes in spectra. In the latter approaches, fertile fuel conversion continues at a relatively high level even late in a fuel bundle lifetime. The resulting actinide products are not given sufficient time for fissioning before the fuel bundle is retired. The present approach provides for more complete burnup of actinide products, thus solving waste disposal problems.

Moreover, since the neutron spectrum limits the reactivity of a fresh bundle, burnable poisons can be minimized. This means fewer burnable poisons and poison byproducts near the end of the fuel bundle lifetime. Thus, fissioning is not terminated before its time. Once again, the result is a more complete burnup, more efficient fuel utilization, and less radioactive waste. These and other features and advantages of the present invention are apparent in the following description with references to the drawings below.

DESCRIPTION OF THE PREFERRED EMBODIMENTS

Figure 1:
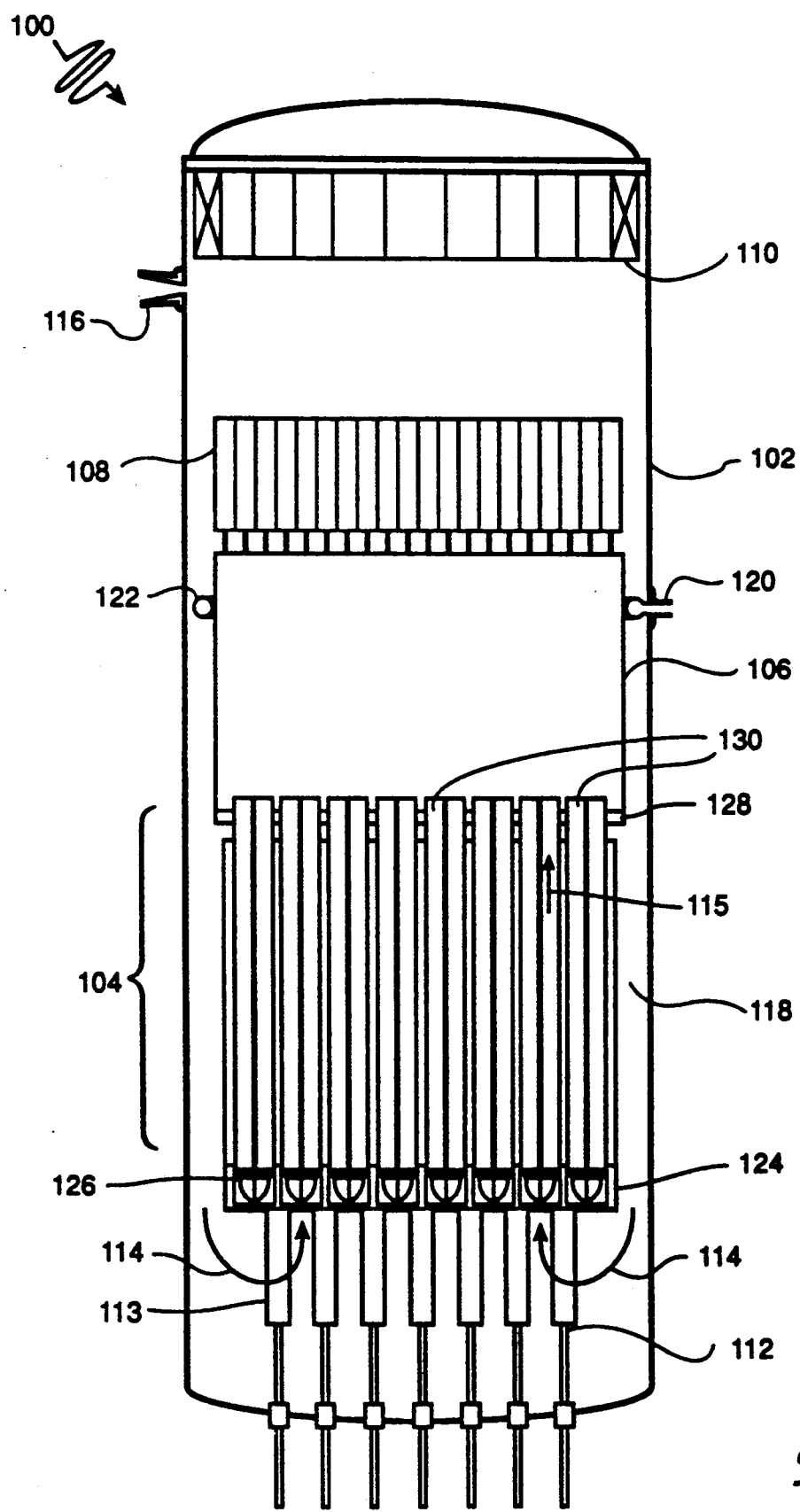
FIG. 1 is a schematic elevational sectional view of a boiling-water reactor in accordance with the present invention.

In accordance with the present invention, a boiling-water reactor 100 comprises a vessel 102, a core 104, a chimney 106, a steam separator 108, and a dryer 110. Control rod drive housings 112 extend through the bottom of vessel 102 and support control rod guide tubes 113. Control rod guide tubes 113 extend to the bottom of core 104 so that control blades therein can be inserted into and retracted from core 104 to control its power output.

Water flows, as indicated by arrows 114, into core 104 from below. This subcooled water is boiled within core 104 to yield a water/steam mixture which rises through core 104 and chimney 106, as indicated by an arrow 115. Steam separator 108 helps separate steam from water, and the released steam exits through a steam exit 116 near the top of vessel 102. Before exiting, any remaining water entrained in the steam is removed by dryer 110. Water is returned down a peripheral downcomer 118 by the force of the driving steam head provided by chimney 106. Feedwater enters vessel 102 through a feedwater inlet nozzle 120 and a feedwater sparger 122 to replenish and to help cool the recirculating water in downcomer 118.

Figure 2:
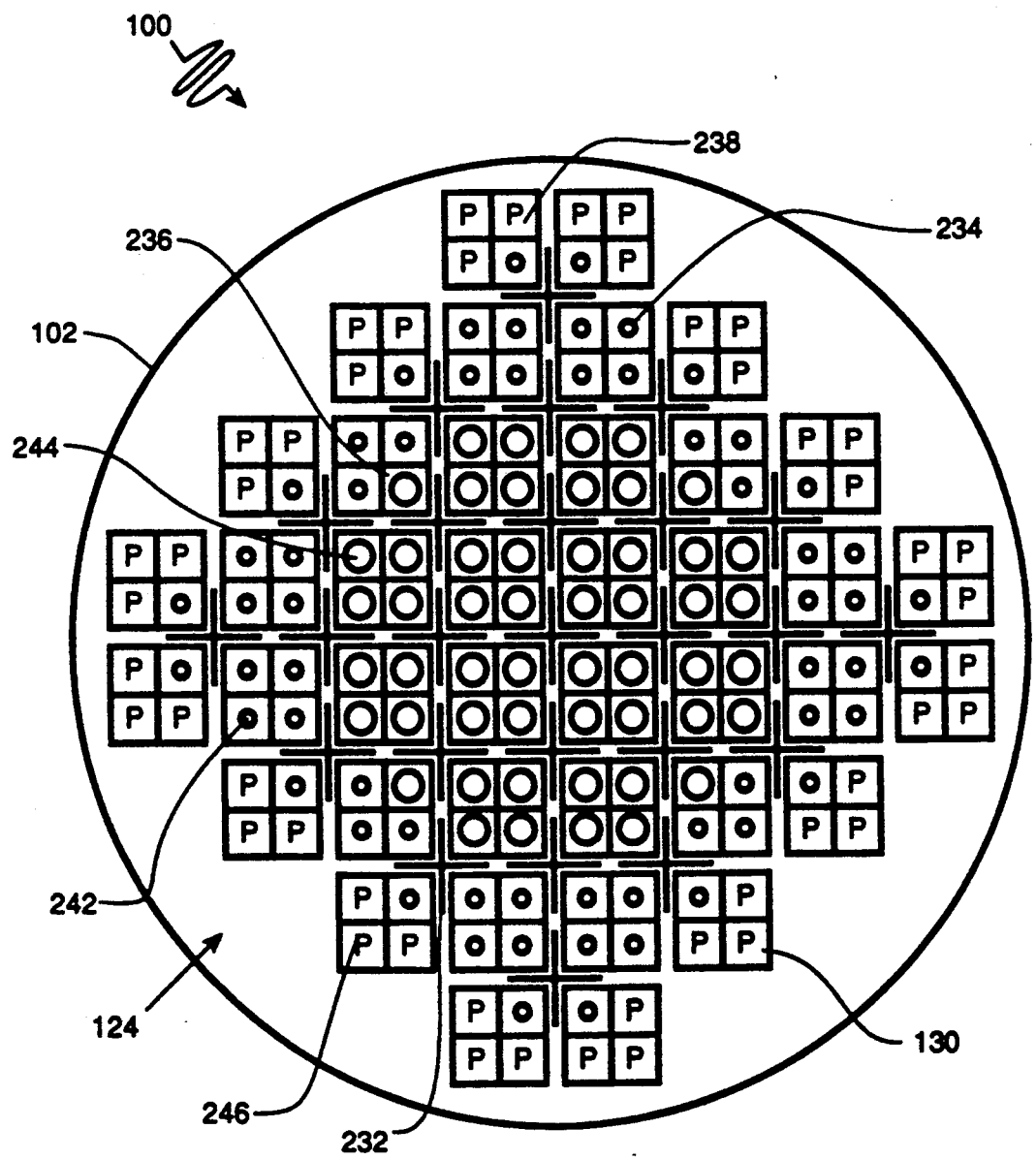
FIG. 2 is a schematic upper sectional view of the reactor of FIG. 1.

Core 104 is bounded from below by a core support plate 124, along with associated orificed support stubs 126, and bounded from above by a top guide 128. These structures support and aid in the installation of fuel bundles 130 that constitute core 104. Fuel bundles 130 are arranged in a two-dimensional array, as shown in FIG. 2. Spaces are left between groups of four fuel bundles for control rods 232 with cruciform cross sections to move vertically to regulate power output.

Fuel bundles 130 are divided into three groups, a group of relatively fresh bundles 234, a group of bundles 236 at mid-life, and a group of bundles 238 near the end of their useful lifetime. Orificed support stubs 126 are likewise divided into three groups, small-orificed stubs 242 (small circles in FIG. 2), large-orificed stubs 244 (large circles in FIG. 2), and peripheral stubs 246 (at locations marked "P"), which also have small orifices. Fresh fuel bundles 234 are disposed over small-orificed stubs 242, mid-life bundles 236 are disposed over large-orificed stubs 244, and late-life fuel bundles 238 are disposed over peripheral stubs 246. The locations of fresh bundles 234 are radially between the more central locations of the mid-life bundles 236 and the more peripheral late-life bundles 238. Small-orificed stubs 242 and peripheral stubs 246 define 1" apertures through core support plate 124, while large-orificed stubs 244 define 2" apertures through core support plate 124.

Figure 3:
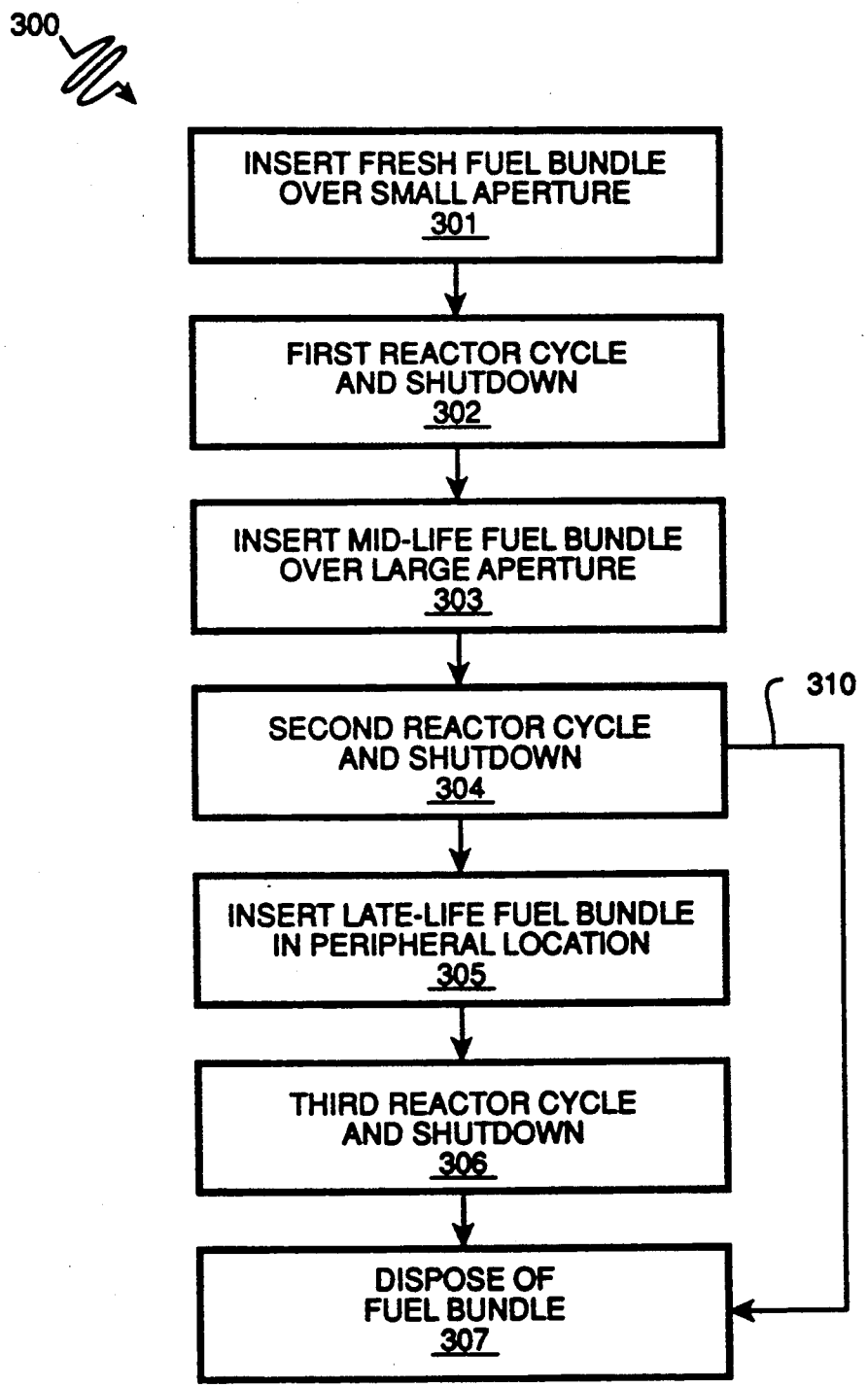
FIG. 3 is a flow chart of a fuel management method in accordance with the present invention and used with the reactor of FIG. 1.

The fuel arrangement of FIG. 2 results from the fuel management method 300 illustrated in FIG. 3. Fresh fuel bundles are inserted (at step 301) into core locations defined by small-orificed stubs. A first reactor cycle, including operation and shutdown, is implemented (at step 302). During this first reactor cycle, the restricted coolant flow established by the small orifices result is a fast neutron spectrum, limiting fissioning and promoting the conversion of fertile U238 to fissile Pu241. The conversion/fission ratio is between about 0.7 to 0.8, compared to a 0.5 to 0.6 in a conventional fuel bundle arrangement. (A ratio in excess of 1.0 would characterize a breeder reactor which produces more fissile fuel than it uses.) This substantially increases the fertile fuel available at mid-life.

During the present or a subsequent refueling cycle, the subject bundle, now at mid-life, is inserted (at step 303) into a more central location over a large-orificed stub. A second reactor operation cycle is implemented (at step 304). During this second cycle, the large-orificed stub permits a relatively fast coolant flow through the bundle, resulting in a smaller steam void, more moderation, and a more thermal neutron spectrum. As a result, fissioning is promoted at the expense of conversion. During this cycle, the conversion ratio is about 0.3–0.4. Thus, fewer actinide products are being generated, while those resulting from the first cycle are given at least the entire second cycle for burnup.

While the present invention provides for disposal of a fuel bundle (at step 307) after this second cycle, as indicated by branch 310, a late-life bundle can be inserted into a peripheral location (at step 305). During a subsequent third cycle and shutdown (at step 306), the late-life bundle makes a modest contribution to core reactivity and shields core externals from the more intense radiation near the center of the core. Eventually, the spent fuel bundle is removed and disposed of (at step 307).

In the illustrated embodiment, the different sized apertures through the core support plate were defined using stubs with different sizes of orifices. Alternatively, the apertures could be defined in the core support plate itself. Alternatively, an attachment could narrow the otherwise large orifice of a stub to provide smaller-orificed stubs. In this vein, the orifice constriction can be built into the bundles, and either adjusted or removed during a refueling operation. While the illustrated embodiment used only two orifice sizes, more gradations are employed in other embodiments. Further, coolant flow rates can be varied by location in ways not relying on flow apertures.

While the illustrated embodiment shows core locations arranged in three bands in radial succession, many alternative arrangements are provided for. More bands can be used to provide a succession of steps toward locations with larger orifices and/or locations otherwise provided with faster coolant flow rates. Bands can alternate to smooth the reactivity profile along a core radius. For example, a small-orificed band can be inserted between two large-orificed bands to soften a thermal peak near the core center. Furthermore, orifice-define groups of locations need not be defined by bands at all. Checkerboard arrangements, random arrangements, and many alternatives are also provided for. Wherever a design analysis indicates excess reactivity, a small-orificed location can be exchanged for a large-orificed location.

Fuel bundles can progress cycle by cycle. Alternatively, some fuel bundles can remain in place or be transferred within orifice size subgroup during a refueling cycle. The present invention provides for some bundles following patterns not in accordance with FIG. 3, as long as some fuel bundles progress from small-orificed locations to large-orificed locations. It should be noted that the present invention is compatible with many other fuel management strategies including bundle inversion to improve axial burnup uniformity. These and other modifications to and variations upon the described embodiments are provided for by the present invention, the scope of which is limited only by the following claims.

What is claimed is:

1. A fuel management method for a dual-phase nuclear reactor, said method comprising:
    installing a fuel bundle at a first core location accessed by coolant through a relatively small aperture, each of said bundles having a predetermined group of fuel elements;
    operating said reactor a first time;
    shutting down said reactor;
    reinstalling said fuel bundle at a second core location accessed by coolant through a relatively large aperture; and
    operating said reactor a second time.

2. A method as recited in claim 1 wherein said second core location is radially inward of said first core location.

3. A method as recited in claim 2 further comprising additional steps following said step of operating said reactor a second time, said additional steps comprising:
    shutting down said reactor;
    reinstalling said fuel bundle at a peripheral core location; and
    operating said reactor a third time.

4. A method as recited in claim 3 further comprising additional steps following said step of operating said reactor a third time, said additional steps comprising:
    shutting down said reactor; and
    disposing of said fuel bundle so that said fuel bundle is installed exactly three times in said reactor.

5. A fuel management method for a dual-phase nuclear reactor, said method comprising:
    installing a fuel bundle at a first core location accessed by coolant through a relatively small aperture so as to establish a relatively low coolant flow rate and thus a relatively high conversion ratio in said bundle when said reactor is next operated;
    operating said reactor a first time;
    shutting down said reactor;
    reinstalling said fuel bundle at a second core location accessed by coolant through a relatively large aperture so as to establish a relatively high coolant flow rate and thus a relatively low conversion ratio when said reactor is next operated, said second core location being radially inward of said first core location; and
    operating said reactor a second time.

6. A method as recited in claim 5 further comprising additional steps following said step of operating said reactor a second time, said additional steps comprising:
    shutting down said reactor;
    reinstalling said fuel bundle at a peripheral core location characterized by a relatively low coolant flow rate; and
    operating said reactor a third time.

7. A core for a dual-phase nuclear reactor comprising:
    a core plate defining an array of fuel bundle locations, including conversion locations and power locations, said power locations being characterized by larger flow orifices than said conversion locations, said conversion locations being located radially outside said power locations;
    fuel bundles with relatively large quantities of fertile fuel disposed at said conversion locations; and
    fuel bundles with relatively large quantities of fissile conversion products at said power locations;
    whereby, when an incorporating reactor is operating, said fuel bundles with relatively large quantities of fertile fuel are exposed to relatively large voids and thus to fast neutrons that promote conversion of fertile fuel to fissile fuel, said fuel bundles with relatively large quantities of fissile conversion products are exposed to relatively small voids so that moderation is greater and more thermal neutrons are present to promote fissioning.

8. A reactor core as recited in claim 7 wherein said core plate also includes peripheral locations and said core further comprises:
    fuel bundles with relatively little fissile fuel and relatively large quantities of fission byproducts at said peripheral locations, said fuel bundles at said peripheral locations each having a face not opposing any other of said fuel bundles in said core.

* * * * *